(12) United States Patent
Maresh et al.

(10) Patent No.: US 7,648,318 B2
(45) Date of Patent: Jan. 19, 2010

(54) LOAD RESTRAINT APPARATUS AND METHOD FOR PROTECTING PRODUCTS FROM DAMAGE DURING SHIPMENT

(75) Inventors: Mark Edmund Maresh, Phoenix, AZ (US); Eric Allen Stegner, Durham, NC (US); Robert William Stegner, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 414 days.

(21) Appl. No.: 11/566,305

(22) Filed: Dec. 4, 2006

(65) Prior Publication Data

US 2008/0131227 A1 Jun. 5, 2008

(51) Int. Cl.
*B60P 7/08* (2006.01)

(52) U.S. Cl. .................. 410/145; 410/144; 410/150

(58) Field of Classification Search ......... 410/143–146, 410/149, 150, 121, 130–132, 135, 129; 248/354.1, 248/354.5, 354.6; 211/105.3
See application file for complete search history.

(56) References Cited

U.S. PATENT DOCUMENTS

| | | | |
|---|---|---|---|
| 1,951,660 A | 3/1934 | Klaudt | |
| 3,782,295 A | 1/1974 | Balinski | |
| 3,995,565 A | 12/1976 | Kersey | |
| 4,079,677 A | 3/1978 | Vandergriff et al. | |
| 4,702,653 A | 10/1987 | Gaulding et al. | |
| 4,982,922 A | 1/1991 | Krause | |
| 5,028,185 A | 7/1991 | Shannon | |
| 5,104,269 A | 4/1992 | Hardison | |
| 5,219,251 A | 6/1993 | Kanczuzewski | |
| 5,281,063 A | 1/1994 | Austin, III | |
| 5,807,047 A | 9/1998 | Cox | |
| 5,890,856 A | 4/1999 | Huang | |
| 5,941,667 A | 8/1999 | Hardison | |
| 6,068,433 A | 5/2000 | Baloga | |
| 6,074,143 A * | 6/2000 | Langston et al. | 410/89 |
| 6,086,299 A | 7/2000 | Kanczuzewski | |
| 6,364,583 B1 | 4/2002 | Koller | |
| 6,722,829 B2 | 4/2004 | Williams | |
| 6,824,341 B2 | 11/2004 | Ehrlich | |
| 2005/0201842 A1 | 9/2005 | Dean et al. | |

\* cited by examiner

*Primary Examiner*—Stephen Gordon
(74) *Attorney, Agent, or Firm*—Steven L. Bennett; Daniel E. McConnell

(57) ABSTRACT

An arrangement of securing frame assemblies is provided within a shipping enclosure and engaging packages being handled. The frame assemblies are secured to side walls of the container and act in pairs to extend from respective sides and join together to form bracing barriers extending across the width of the container.

5 Claims, 4 Drawing Sheets

LOAD RESTRAINT APPARATUS AND METHOD FOR PROTECTING PRODUCTS FROM DAMAGE DURING SHIPMENT

FIELD AND BACKGROUND OF INVENTION

This invention relates to apparatus and methods useful in shipping products, and particularly to protecting against damage to packages shipped in shipping enclosures such as sea or air freight containers, truck bodies including trailers, rail cars and the like by restraining the packages against movement within the container.

The use of conventional load stabilization practices for shipment of goods in containers and truck bodies exposes loads to shifting, tipping and tumbling. Such unrestrained movement during handling causes damage to packaging and to goods packaged within, result in shipping losses.

Prior practices seeking to overcome this problem have included load bars, portable air bags, strapping and bracing against the interior wall surfaces of the enclosure using site built frames of wood or the like. Difficulties encountered include non-use of load bars due to theft and load bars that come loose during shipment causing freight damage. Air bags as previously proposed are expensive, difficult to use and are subject to over inflation. Air bags are often discarded after a single use and are deficient in holding a uniform pressure overtime, temperature variation and altitude changes. Site built bracing is a labor intensive manual process which increases loading and unloading time and are inconsistent across shipping locations and companies.

SUMMARY OF THE INVENTION

With the foregoing in mind, it is one purpose of this invention to improve the stabilization of freight within a shipping enclosure such as sea or air freight containers, truck bodies including trailers, rail cars and the like. In realizing this purpose, an arrangement of securing frame assemblies is provided within a shipping enclosure and engages packages being handled.

In accordance with this invention, the frame assemblies are secured to side walls of the container and act in pairs to extend from respective sides and join together to form bracing barriers extending across the width of the container.

BRIEF DESCRIPTION OF DRAWINGS

Some of the purposes of the invention having been stated, others will appear as the description proceeds, when taken in connection with the accompanying drawings, in which.

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

Figure 1:
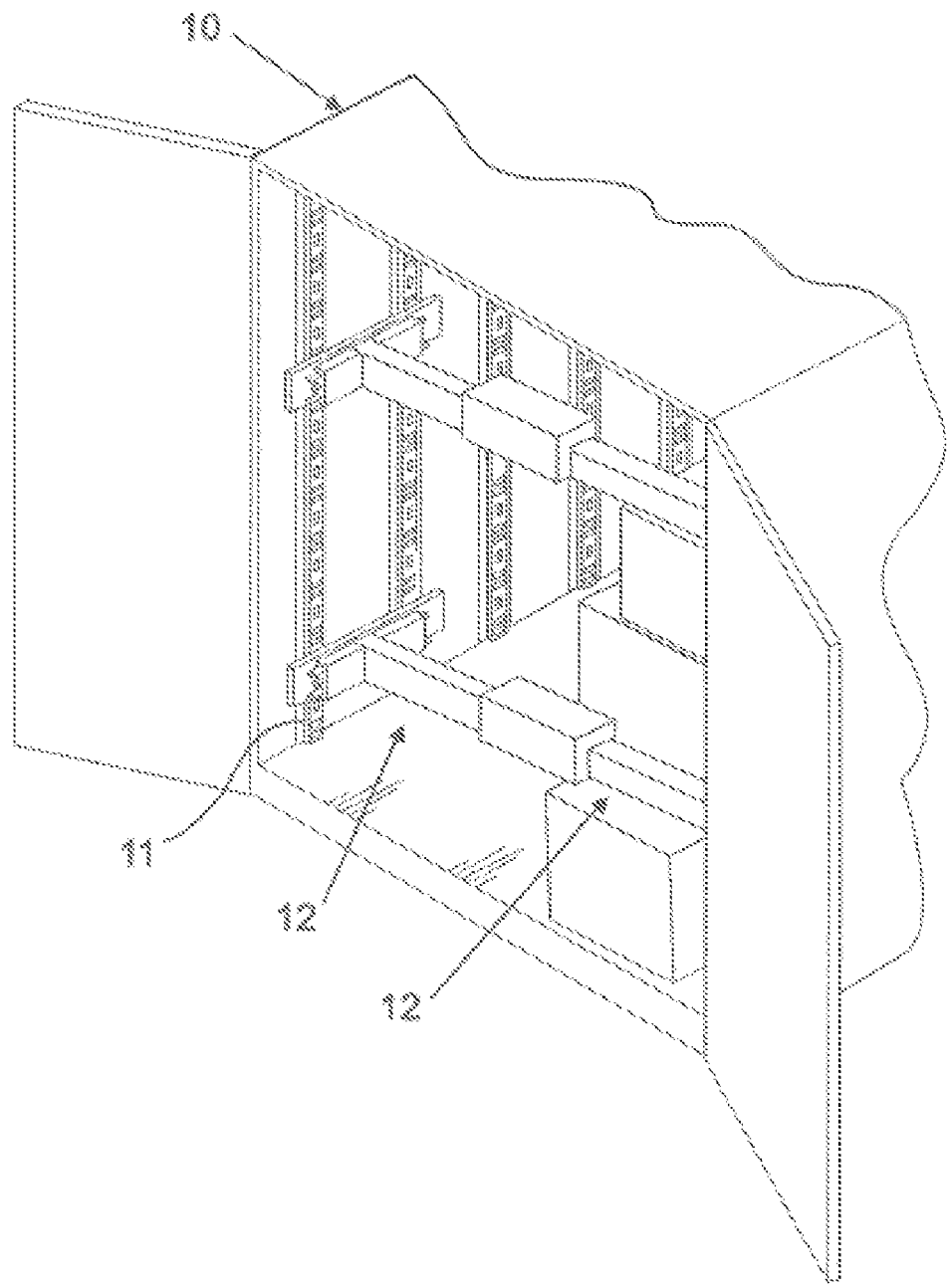
FIG. 1 is a perspective view of a shipping enclosure with the apparatus of this invention in place.

Referring now more particularly to the accompanying drawings, FIG. 1 shows a shipping enclosure 10 which is a portion of the invention here described. The enclosure 10 may be any one of a sea or air freight container, a truck body including trailers, a rail car and the like. For purposes of the illustration, the enclosure is simply an elongate box, having inward facing side walls, top and bottom walls. In FIG. 1 the enclosure 10 is shown to have vertically extending rails 11 secured on or in the inwardly facing side walls. As will be understood from the prior art, such rails may extend within an enclosure vertically along side walls, horizontally along side walls, longitudinally along the top (ceiling) or bottom (floor) surfaces, or from side-to-side along the ceiling and floor surfaces. While only one orientation has here been shown, the present invention contemplates that any of the mentioned orientations and combinations of them may be present in—and used as described hereinafter—in a shipping enclosure in which the present invention is implemented.

Figure 2:
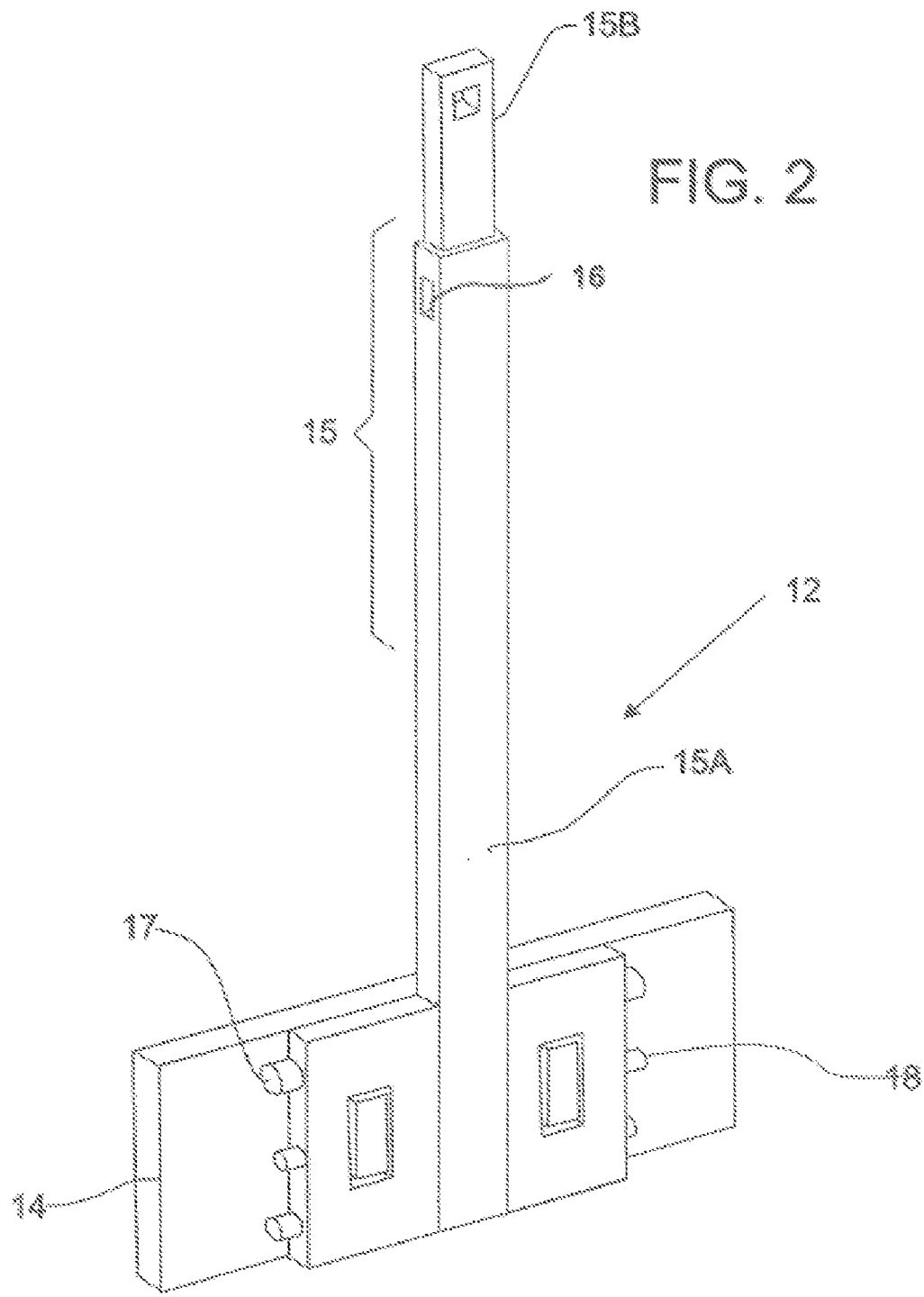
FIG. 2 is a perspective view of certain elements of this invention.
Figure 3:
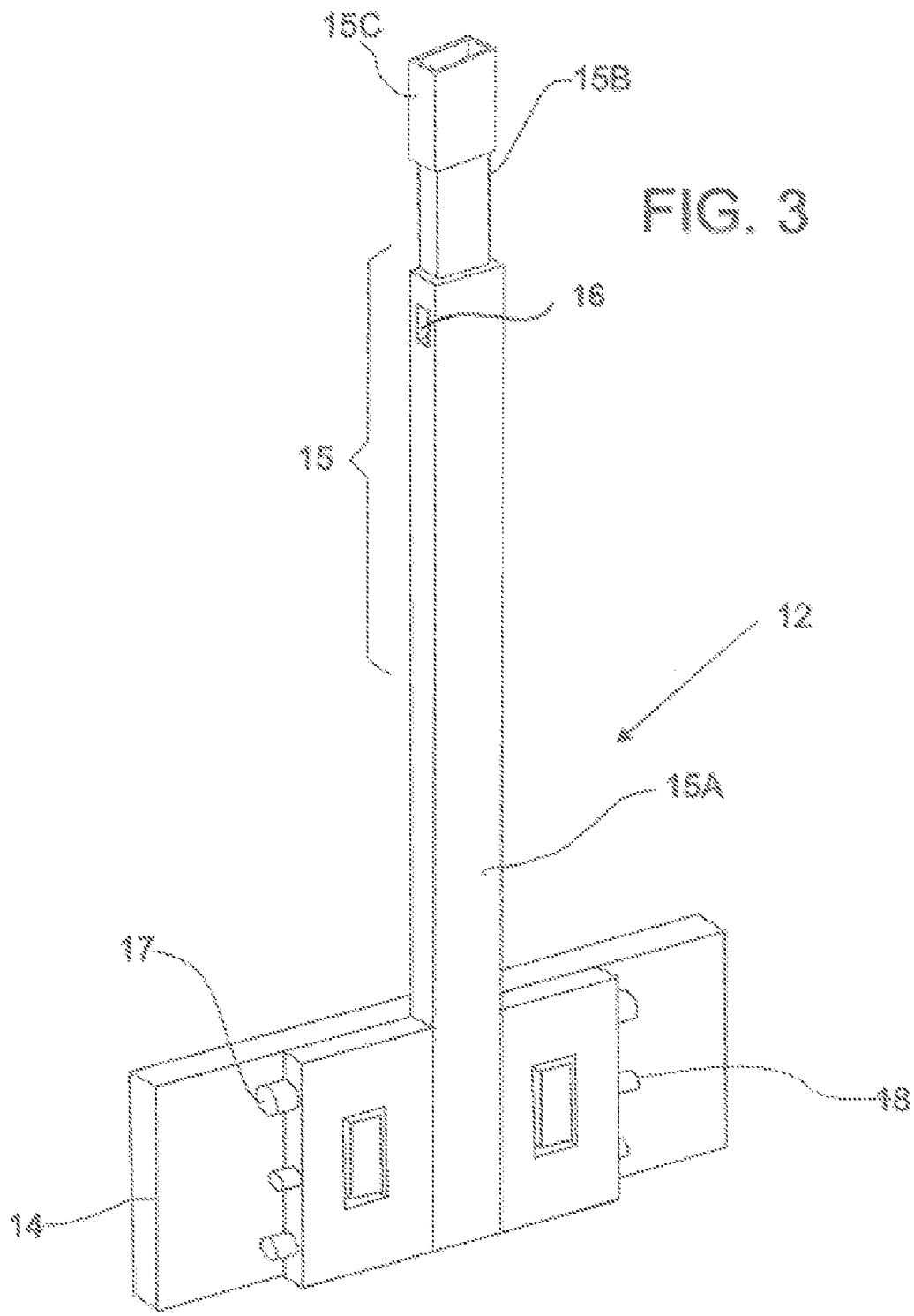
FIG. 3 is a view similar to FIG. 2 showing other elements of this invention.

In accordance with this invention, a pair of securing frames 12 (or sets of frames—a plurality will commonly be employed as will become more clear hereinafter) is provided which engages packages disposed within the enclosure for shipment and secures the packages against damage otherwise possibly occurring. The frames 12 are shown in FIGS. 1 through 3 and partially in FIG. 4. However, FIGS. 2 and 3 are particularly useful in the present discussion. As there shown, each of two securing frames 12 has a base portion 14 which will engage the fastener rails 11 within the enclosure 10 and a pivotally mounted extensible arm portion 15. The securing frame is preferably constructed with metal members that impart substantial rigidity and has fixtures on the base portion adapted to lock into the rails 11. The frames 12 may be stored out of goods engagement within the enclosure 10 when not needed to secure a load, as during loading or unloading of goods or transport of an empty enclosure. That is, the extensible arm portion may be pivoted against the wall of the enclosure and secured there so as to be out of the way.

In accordance with the present invention, and as shown in FIG. 2, the telescoping load restraint system of this invention is integrated into the side walls of the enclosure 10. Referring now to only one of the pair of assemblies, the assembly (FIG. 2) has an extensible arm 15 pivotally attached to the base portion 14. The extensible arm has two portions, one 15A pivotally attached to the base 14 and the other 15B mounted within the first for extension relative thereto. The two portions 15A and 15B are normally secured together by a lock 16 which prevents extension of the member 15B relative to the member 15A attached to the base 14.

The base portion 14 secures the restraint to the wall of the enclosure. When stored out of use position, the arm 15 is pivoted vertically against the wall and locked in position by a lock 17 provided in the base 14. The base 14 also has a lock 18 which engages the rail 11 to secure the restraint at a selected position vertically along the wall of the enclosure. When to be moved to a use position, an operator would release the lock 18 and move the base to a vertical position appropriate to engage the goods within the enclosure, and then lock the base in position. Once locked into vertical position, the lock 17 is released and the arm 15 moved to a horizontal position. Once moved to a horizontal position (as shown in FIG. 1), the lock 16 is released, and the extensible portion 15B extended across the enclosure to engage goods to be restrained.

Figure 4:
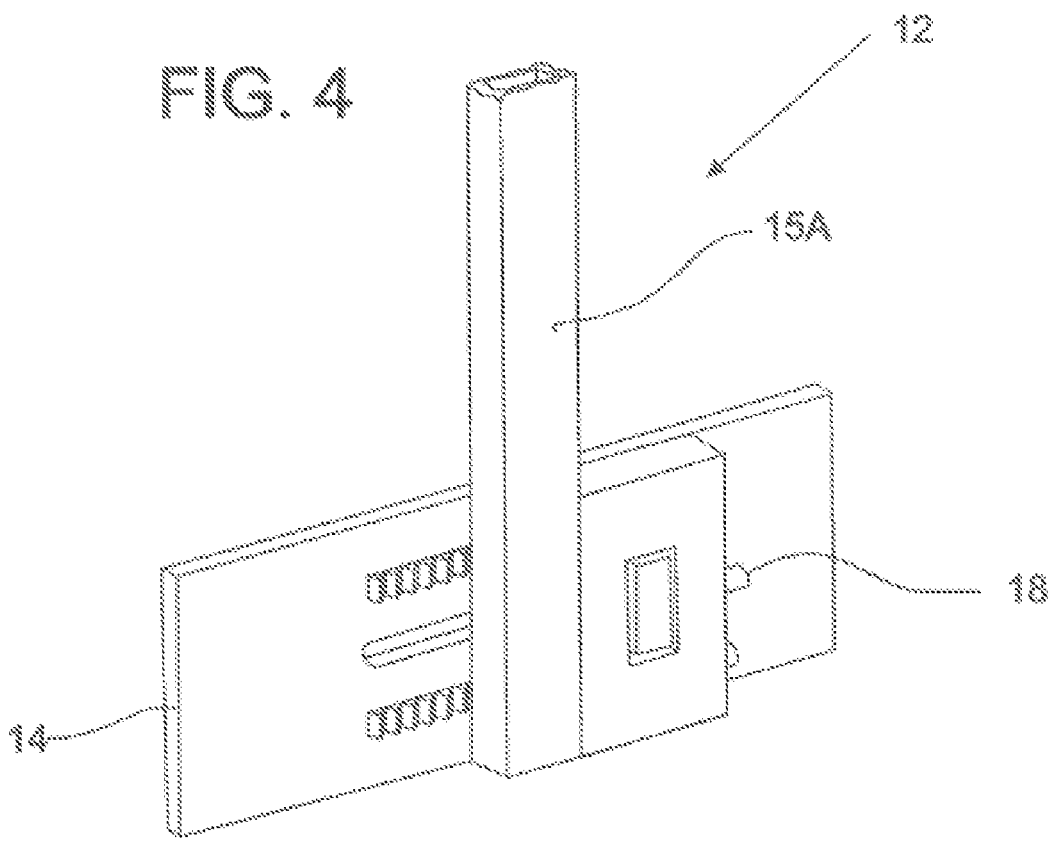
FIG. 4 is a partially redacted view similar to portions of FIGS. 2 and 3, showing certain features of a base portion of the elements there shown.
Figure 5:
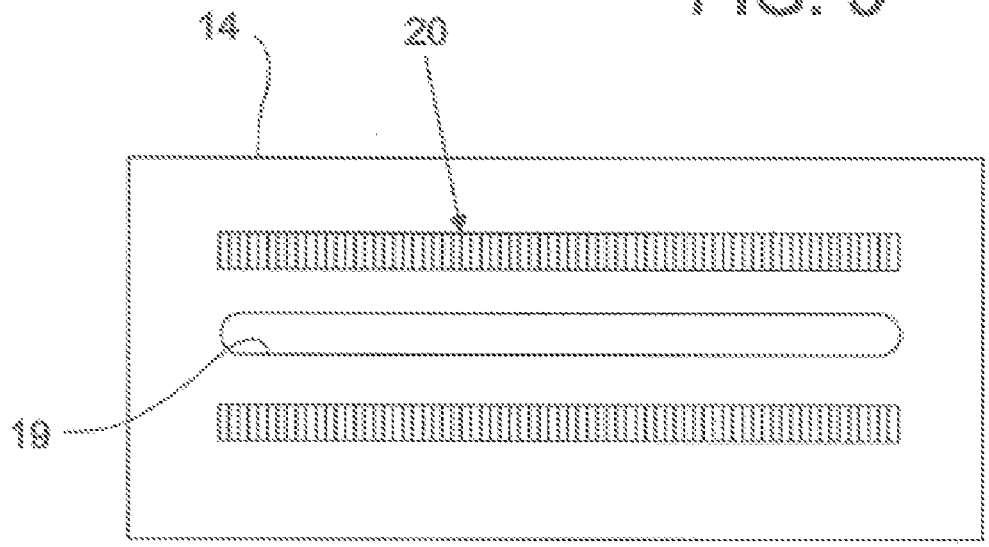
FIG. 5 is an elevation view of one component of the elements of FIGS. 2 and 3.

As shown in FIGS. 4 and 5, the base portion 14 of each of the arm assemblies has provision for accommodating movement transversely of the vertical rails 11 within the enclosure. This movement permits adjusting the restraint position to accommodate contained packages which may have dimensions resulting in the packages being positioned within the enclosure out of direct alignment with the rails. As shown in FIG. 5, the base 14 has an elongate slot 19 to permit such adjustment and a series of teeth 20 which are engaged by a latch within the arm assembly when the assembly is correctly positioned. Thus there are two adjustments to accommodate a load: vertical along the rails 11 and horizontally transverse of the rails.

The paired arm assembly is shown in FIG. 3, where the reference characters used are shared with FIG. 2. The exception is the provision, in an opposing arm assembly, of a sleeve-like third member 15C engaging the extensible member 15B. The sleeve member 15C is sized to slide over the second member 15B of both of the arm assemblies. When the arms are moved into opposing relationship to secure a load (FIG. 1), the third member 15C is moved to enclose the terminal ends of both extensible members 15B and secured in position with a latch or other device to complete the restraint.

In the drawings and specifications there has been set forth a preferred embodiment of the invention and, although specific terms are used, the description thus given uses terminology in a generic and descriptive sense only and not for purposes of limitation.

What is claimed is:

1. Apparatus comprising:
    a shipping enclosure having fastener rails secured to inward facing walls thereof; and
    a securing frame which engages packages disposed within the enclosure for shipment and secures the packages against damage otherwise possibly occurring; said securing frame having
        a pair of arm assemblies, each arm assembly having a base portion secured to one of said fastener rails on one of the inward facing walls and an extensible arm pivotally mounted on said base portion, said extensible arms being extensible one toward the other and joining together to together form a barrier securing packages in place, each of said arm assemblies comprising a first portion pivotally attached to said base portion and a telescoping extensible portion mounted in said first portion, and
        said securing frame further comprising a sleeve mounted on said extensible portion of one of said arm assemblies which selectively secures the corresponding extensible portion of the other of said arm assemblies in telescoped position relative to a corresponding first portion.

2. Apparatus according to claim 1 further comprising a lock mounted in each of said base portions which selectively secures the corresponding base portion in position disposed along the corresponding one of said fastener rails.

3. Apparatus according to claim 2 wherein said lock selectively secures the corresponding base portion in position longitudinally along the corresponding one of said fastener rails.

4. Apparatus according to claim 2 wherein said lock selectively secures the corresponding base portion in position transversely of the corresponding one of said fastener rails.

5. Apparatus according to claim 1 further comprising a lock mounted in each of said base portions which selectively secures the corresponding arm assembly in a position lying along an inward facing wall of said enclosure.

* * * * *